(12) United States Patent
Chang

(10) Patent No.: US 7,443,492 B2
(45) Date of Patent: Oct. 28, 2008

(54) DEVICE AND METHOD FOR TESTING LENS MODULES

(75) Inventor: Keng-Ming Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 129 days.

(21) Appl. No.: 11/619,466

(22) Filed: Jan. 3, 2007

(65) Prior Publication Data
US 2007/0279619 A1 Dec. 6, 2007

(30) Foreign Application Priority Data
Jun. 2, 2006 (CN) .................. 2006 1 0060955

(51) Int. Cl.
*G01B 9/00* (2006.01)
(52) U.S. Cl. .................................. 356/124
(58) Field of Classification Search .............. None
See application file for complete search history.

(56) References Cited
U.S. PATENT DOCUMENTS 3,877,788 A * 4/1975 Sprague et al. ............. 356/124
5,574,555 A * 11/1996 Yamaguchi et al. ......... 356/125
5,966,209 A   10/1999 Cheng et al.
7,126,100 B1  10/2006 Chuang et al.
7,379,171 B2 * 5/2008 Wang et al. ................ 356/124

* cited by examiner

*Primary Examiner*—Michael P Stafira

(57) ABSTRACT

A device and a method for testing lens modules are disclosed in accordance with a preferred embodiment. The device includes a testing platform, an image sensor, a light source assembly, and a turnplate. The testing platform defines a receiving opening for receiving the turnplate therein. The image sensor faces towards the receiving opening. The light source assembly is disposed at a side of the testing platform opposite to the image sensor. The light source assembly is aligned with respect to the image sensor. The light source assembly is configured for providing a testing specimen. The turnplate defines at least two through holes. Each through hole is configured for receiving the lens modules therein and being sequentially aligned with respect to the image sensor. The image sensor is configured for catching images of the testing specimen formed by the lens module in each through hole.

18 Claims, 3 Drawing Sheets

DEVICE AND METHOD FOR TESTING LENS MODULES

TECHNICAL FIELD

The present invention relates to testing devices and, more particularly, to devices for testing lens modules and testing methods using the devices.

BACKGROUND

Currently, digital camera modules are included as a feature in a wide variety of portable electronic devices. Most portable electronic devices are becoming progressively more miniaturized over time, and digital camera modules are correspondingly becoming smaller and smaller. Nevertheless, in spite of the small size of a contemporary digital camera module, consumers still demand excellent image quality.

As is well known, testing processes play a significant role in ensuring image quality of digital cameras. A typical testing device used in testing processes uses a modulation transfer function (MTF) testing apparatus to test the image quality of a lens module in the digital camera module. The MTF testing apparatus includes a platform and a through hole defined therein. The through hole is configured for supporting the lens module to be tested. However, after the lens module is tested, the lens module needs to be removed manually and another lens module can then be positioned on the through hole manually. Thus, the testing apparatus has a low efficiency in testing lens modules.

Furthermore, the MTF testing apparatus can inspect only one lens module at a time. This results in a low efficiency in testing lens modules and is unsatisfactory in industrial large-scale production of camera modules.

What is needed, therefore, is a lens module testing device that has a relatively high testing efficiency and can achieve continuous large-scale testing of lens modules.

What is needed, therefore, is a testing method using the device.

SUMMARY

In accordance with a preferred embodiment, a device for testing lens modules includes a testing platform, an image sensor, a light source assembly, and a turnplate. The testing platform defines a receiving opening for receiving the turnplate therein. The image sensor faces towards the receiving opening. The light source assembly is disposed at a side of the testing platform opposite to the image sensor. The light source assembly is aligned with respect to the image sensor. The light source assembly is configured for (i.e., structured and arranged) providing predetermined testing specimens. The turnplate defines at least two through holes. Each through hole is configured for receiving the lens modules to be tested therein and being sequentially (i.e., one by one) aligned with respect to the image sensor by the rotation of the turnplate. The image sensor is configured for catching images of the testing specimen formed by the lens module in each through hole.

A method for testing lens modules includes the steps of: providing the device for testing the lens modules, the device comprising a testing platform defining a receiving opening; an image sensor facing towards the receiving opening; a light source assembly disposed at a side of the testing platform opposite to the image sensor, the light source assembly being aligned with respect to the image sensor, the light source assembly being configured for providing predetermined testing specimens; and a turnplate received in the receiving opening, the turnplate defining at least two through holes configured for receiving lens modules to be tested; sequentially receiving the lens modules to be tested into the at least two through holes and rotating the turnplate to cause the at least two through holes receiving the lens modules therein to face towards the image sensor one by one; catching the image of the testing specimen formed by the lens modules in the through hole via the image sensor one by one; and determining the testing result based on the image caught by the image sensor.

Other advantages and novel features will be drawn from the following detailed description of preferred embodiments in conjunction with the attached drawings.

BRIEF DESCRIPTION OF THE DRAWINGS

Many aspects of the present device and method can be better understood with reference to the following drawings. The components in the drawings are not necessarily drawn to scale, the emphasis instead being placed upon clearly illustrating the principles of the present device and method. Moreover, in the drawings, like reference numerals designate corresponding parts throughout the several views.

DETAILED DESCRIPTION OF THE PREFERRED EMBODIMENT

Embodiments of the present device will now be described in detail below and with reference to the drawings.

Figure 1:
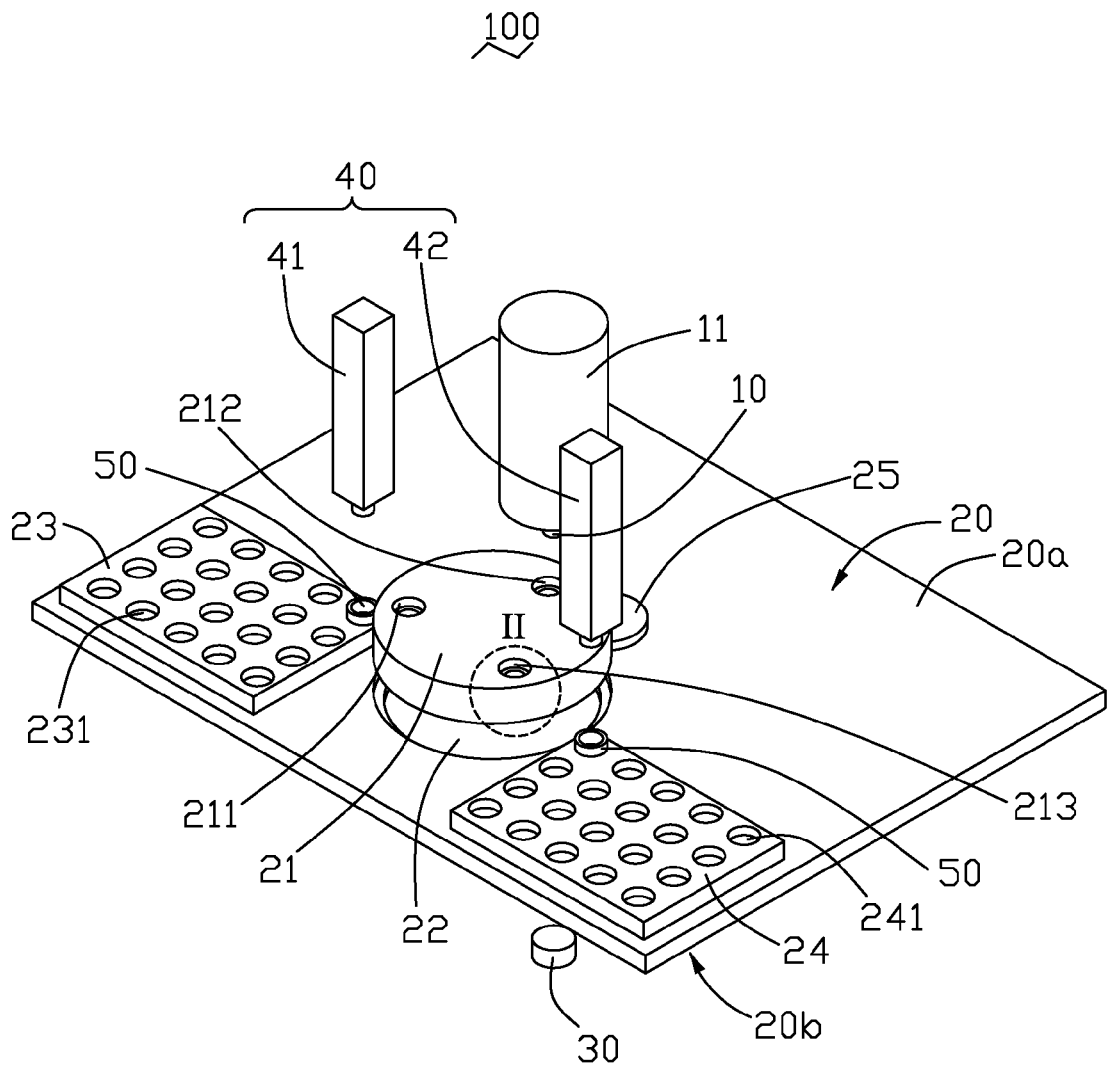
FIG. 1 is a schematic, isometric view of a device for testing lens modules, according to a first preferred embodiment.
Figure 2:
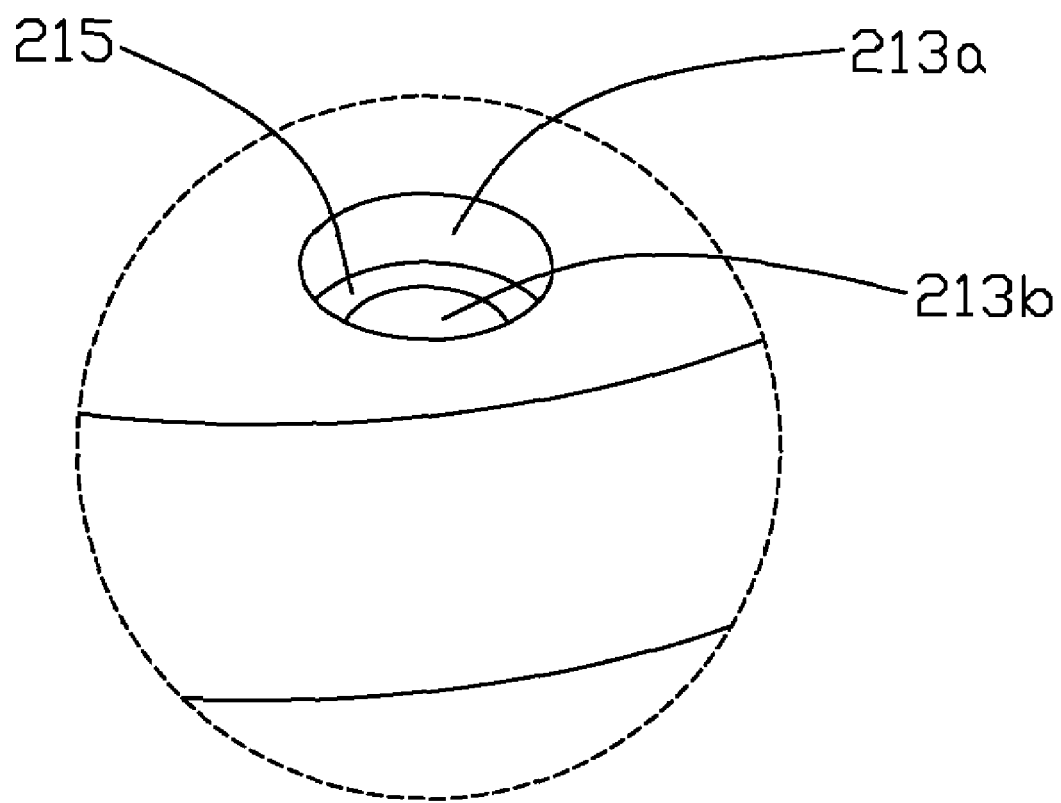
FIG. 2 is an enlarged, schematic view of section 11 of FIG. 1.

FIGS. 1 and 2 illustrate a device 100 for testing lens modules 50, in accordance with a first preferred embodiment. The device 100 includes an image sensor 10, a testing platform 20, a light source assembly 30, a turnplate 21, and a moving assembly 40. The testing platform 20 defines a receiving opening 22 for receiving the turnplate 21 therein. The testing platform 20 is interposed between the image sensor 10 and the light source assembly 30. The image sensor 10 is aligned with respect to the light source assembly 30. The turnplate 21 is configured for supporting the lens modules 50 to be tested.

The image sensor 10 could be, advantageously, a charge coupled device (CCD) or a complementary metal-oxide semiconductor transistor (CMOS). The image sensor 10 is distanced from the turnplate 21 and is firmly secured to an axial motor 11. The axial motor 11 is usefully configured for driving the image sensor 10 to move up and down along a direction perpendicular to the testing platform 20. Accordingly, a distance between the image sensor 10 and the turnplate 21 can be adjusted by the axial motor 11, thereby adjusting imaging definition of the lens modules 50 received in the turnplate 21. An image processing system 12 is beneficially connected to the image sensor 10 for saving and analyzing the image information captured by the image sensor 10. The image processing system 12 could advantageously include a personal computer equipped with image processing software.

The testing platform 20 defines a first surface 20a and a second surface 20b opposite to the first surface 20a. The first surface 20a is advantageously planar and faces towards the image sensor 10. A first tray 23 and a second tray 24 are disposed on the first surface 20a and are respectively disposed near two opposing sides of the turnplate 21. The first and second trays 23, 24 respectively define a plurality of loading holes 231, 241 configured for loading the lens modules 50.

The turnplate 21 defines three through holes 211, 212, and 213. The three through holes 211, 212, and 213 are, advantageously, uniformly distributed at an imaginary circle concentric with the turnplate 21. Thus, by rotating the turnplate 21 through an angle of about 120° every time, positions of adjacent through holes 211, 212, and 213 can be sequentially shifted along the rotation direction of the turnplate 21.

For example, as shown in FIG. 1, the through holes 211, 213 are respectively adjacent to the first and second trays 23, 24, and are respectively located at a feed-in position and a discharge position. The through hole 212 faces towards the image sensor 10, i.e., is located at a testing position. When rotating the turnplate 21 through an angle of about 120° in a clockwise direction, the three through holes 211, 212, and 213 are sequentially shifted to the testing position, discharge position, and feed-in position, respectively along the clockwise direction. As such, one lens module 50 in the through hole 211 faces towards the image sensor 10 and is waiting for testing. The lens module 50 in the through hole 212 has been tested and is waiting for being removed to the second tray 24. The through hole 213 is empty and is waiting for loading the next lens module to be tested from the first tray 23.

The three through holes 211, 212, and 213 are essentially similar to each other. As an example, the through hole 213 has a receiving cavity 213a and a light transmission aperture 213b coaxially adjoining the receiving cavity 213a, as shown in FIG. 2. The receiving cavity 213a is configured for accommodating a lens module 50 to be tested therein. The light transmission aperture 213b has a diameter slightly smaller than the receiving cavity 213a. Accordingly, a step portion 215 is formed at adjoining position of the receiving cavity 213a and the light transmission aperture 213b, for supporting the lens module 50 thereon. The light transmission aperture 213b advantageously has a larger diameter than optical components (not shown) in the lens modules 50 to facilitate the transmission of light from the light source assembly 30 to the optical components. The light transmission aperture 213b could be, advantageously, a trumpet-shaped void. Diameters in cross-section of the light transmission aperture 213b increase from the step portion 215 to the second surface 20b.

The turnplate 21 is driven to rotate along a central axis thereof, for example, by a motor (not shown). The turnplate 21 defines a plurality of gear teeth at a peripheral edge thereof. The gear teeth of the turnplate 21 are configured for engaging with a gear 25 of the motor.

The light source assembly 30 is aligned with respect to the image sensor 10. Thus, when one through hole (e.g., 212) is rotated to the testing position facing towards the image sensor 10, the light source assembly 30 is also aligned with respect to the through hole 212. The light source assembly 30 is beneficially configured for providing predetermined testing patterns/specimen, for example, colored candy strips.

Preferably, a moving assembly 40 is applied in the device 100. In the illustrated embodiment, the moving assembly 40 includes a first robotic arm 41 and a second robotic arm 42. The first robotic arm 41 is configured for removing the lens modules 50 in the first tray 23 to the through hole (e.g., 211) located in the feed-in position. The second robotic arm 42 is configured for removing the lens modules 50 in the through hole (e.g., 213) located in the discharge position to the second tray 24. The first and second robotic arms 41, 42 could be, e.g., a robotic suction cup or a robotic claw.

A method of testing the lens modules 50 using the device 100 includes the steps of: sequentially receiving lens modules 50 to be tested into the three holes 211, 212, 213 and rotating the turnplate 21 to cause the three through holes 211, 212, 213 receiving the lens modules 50 therein to face towards the image sensor 10 one by one; catching the image of the light source assembly 30 formed by the lens modules 50 in the through hole 211, 212, 213 via the image sensor 10 one by one; and determining the testing result based on the image caught by the image sensor 10. The method including these operation processes above can achieve continuous testing of a plurality of lens modules, i.e., continuous large-scale testing of lens modules.

Initially, one lens module 50 is loaded into the through hole 211 from the first tray 23 via the robotic suction cup 41. The turnplate 21 is driven to rotate through an angle of about 120° via the gear 25 so that the through hole 211 is shifted to the testing position of the through hole 212 and faces towards the image sensor 10. At the same time, the through hole 212 is shifted to the discharge position of the through hole 213 and is adjacent to the second tray 24. Likely, the through hole 213 is shifted to the feed-in position of the through hole 211 and is adjacent to the first tray 24.

The image sensor 10 then catches images of the light source assembly 30 (i.e. the pattern/specimen) formed by the lens modules 50 received in the through hole 211. During imaging, in order to improve image definition (i.e., quality), the image sensor 10 can be driven to move along the optical axis of the lens module 50 via the axial motor 11. The image information caught by the image sensor 10 is transmitted to the imaging processing system 12 to be analyzed, thereby obtaining the testing result of this current lens module 50.

The turnplate 21 is driven to rotate an angle of about 120° again via the gear 25 so that the through hole 211 is shifted from the testing position to the discharge position and is adjacent to the second tray 24. The current lens module 50 tested in the through hole 211 located at the discharge position is then discharged to the second tray 24 via the robotic claw 42. As such, the current lens module 50 goes through a testing period from feed-in to testing, and then from testing to discharge.

During imaging of aforementioned testing period, a next lens module to be tested is simultaneously loaded into the through hole 213 shifted to the feed-in position, accordingly initiating a next testing period. Actually, the turnplate 21 is driven to rotate through an angle of 120° every time, a new testing period is initiated. Therefore, as the three through holes 211, 212, 213 are continuously shifted between the feed-in, testing, discharge positions via rotating the turnplate 21, the plurality of lens modules 50 can be tested one by one.

Figure 3:
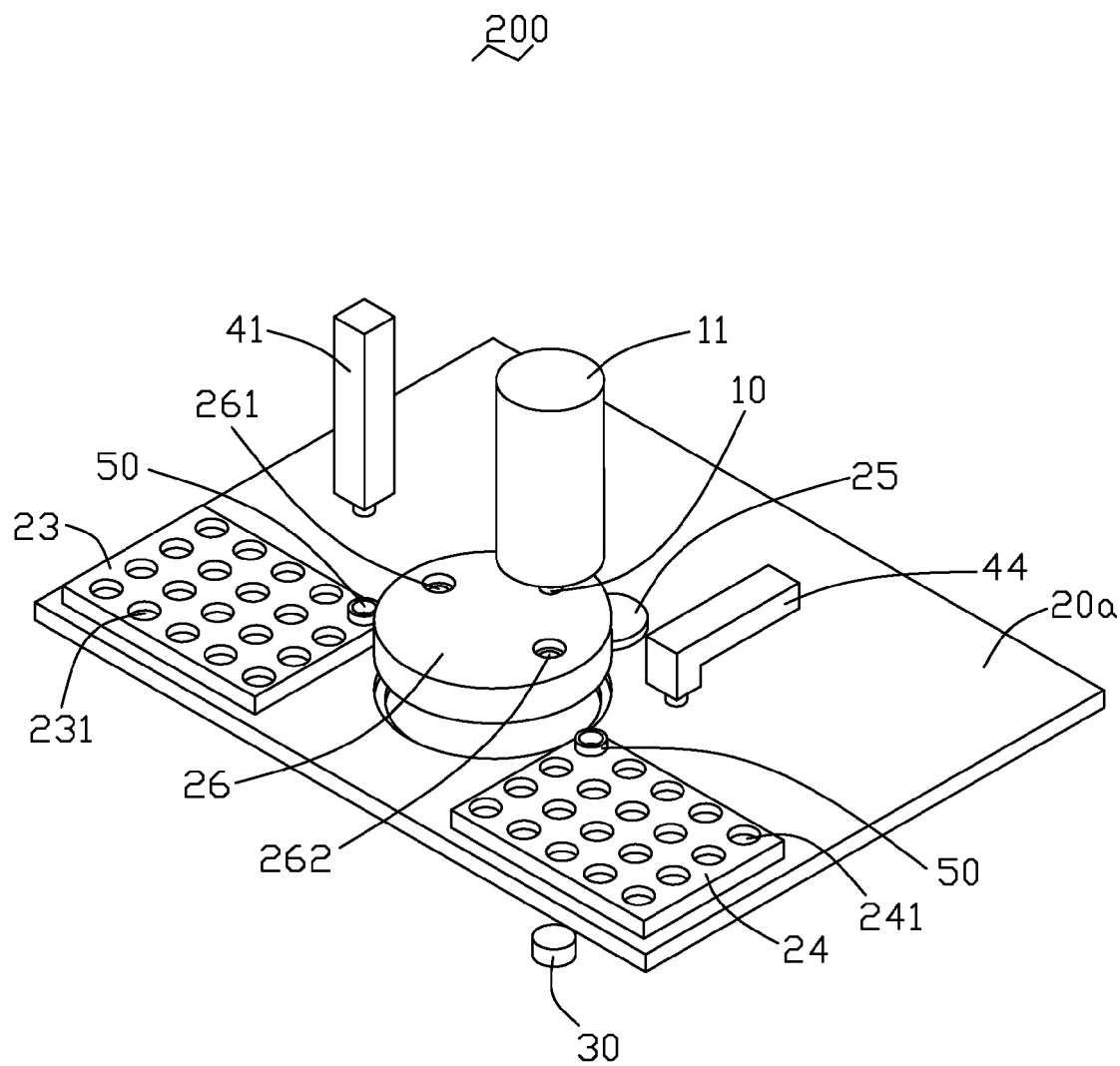
FIG. 3 is a schematic, isometric view of another device for testing lens modules, according to a second preferred embodiment.

FIG. 3 illustrates another device 200 for testing the lens modules 50, in accordance with a second preferred embodiment. The device 200 is essentially similar to the device 100 except with respect to the turnplate 26 and the second robotic arm 44.

The turnplate 26 is essentially similar to the turnplate 21 in the device 100 except of the through holes. The turnplate 26 defines two through holes 261, 262 symmetrically distributed therein with respect to a center axis of the turnplate 26. The two through holes 261, 262 are usefully located adjacent to the first and second trays 23, 24, respectively. The image sensor 10 is correspondingly aligned with the through hole 262. The second robotic arm 44 is a robotic suction cup having an arm portion substantially parallel to the first surface 20a of the testing platform 20. This facilitates the snatch of the lens modules 50 tested along a direction substantially parallel to the first surface 20a.

In this embodiment, the two through holes 261, 262 can be shifted towards each other, for example, via rotating the turnplate 26 by an angle of about 180°. The two through holes 261, 262 are disposed at the feed-in position adjacent to the first tray 23 and the testing position, respectively. The testing position faces towards the image sensor 10 and is adjacent to the second tray 24. Thus, the testing position is also the discharge position where the lens modules 50 is tested and sequentially are in situ removed to the second tray 24. The operation of testing the lens modules 50 using the device 200 is essentially similar to the operation of the device 200. Nevertheless, the device 200 initiates a new testing period via rotating the turnplate 26 through an angle of about 180°.

Since the devices 100, 200 achieve continuous large-scale testing of the lens module 50, the testing efficiency can be significantly increased. As a result, the large-scale productivity of the lens modules 50 is also accelerated. Furthermore, it is to be noted that although two and three through holes are exemplarily illustrated herein, four or more through holes may be optionally selected in the application of the present device by those skilled in the art and be within the scope thereof. The more through holes defined in the turnplate, the higher the testing efficiency of the large scale of lens modules.

It will be understood that the above particular embodiments and methods are shown and described by way of illustration only. The principles and features of the present invention may be employed in various and numerous embodiments thereof without departing from the scope of the invention as claimed. The above-described embodiments illustrate the scope of the invention but do not restrict the scope of the invention.

What is claimed is:

1. A device for testing lens modules, the device comprising:
   a testing platform, the testing platform defining a receiving opening;
   an image sensor facing towards the receiving opening;
   a light source assembly disposed at a side of the testing platform opposite to the image sensor, the light source assembly being aligned with respect to the image sensor, the light source assembly being configured for providing predetermined testing specimens; and
   a turnplate received in the receiving opening, the turnplate defining at least two through holes, each through hole being configured for receiving one lens module to be tested therein and being sequentially aligned with respect to the image sensor along with the rotation of the turnplate, the image sensor being configured for sequentially catching images of the testing specimen formed by the lens module in each through hole.

2. The device as claimed in claim 1, wherein the image sensor is movable with respect to the receiving opening along an axis of one through hole aligned with the image sensor.

3. The device as claimed in claim 1, further comprising two trays disposed on the testing plate, one tray being configured for receiving the lens modules to be tested, the other tray being configured for receiving the lens modules tested.

4. The device as claimed in claim 1, further comprising a moving assembly configured for moving the lens modules.

5. The device as claimed in claim 4, wherein the moving assembly comprises two robotic arms, one robotic arm being configured for carrying the lens modules to be tested to the through holes, the other robotic arm being configured for carrying away the lens modules tested from the through holes.

6. The device as claimed in claim 5, wherein each robotic arm comprises one of a robotic suction cup and a robotic claw.

7. The device as claimed in claim 1, wherein the at least two through holes comprises two through holes symmetrically defined in the turnplate with respect to an axis of the turnplate.

8. The device as claimed in claim 1, wherein the at least two through holes comprises three or more through holes uniformly distributed at an imaginary circle in the turnplate, the imaginary circle being concentric with respect to an axis of the turnplate.

9. The device as claimed in claim 1, wherein each through hole comprises a receiving cavity configured for accommodating the lens module to be tested therein and a light transmission through hole coaxially adjoining the receiving cavity, the light transmission aperture having a slight smaller diameter than the receiving cavity.

10. The device as claimed in claim 1, wherein the light transmission aperture is a trumpet-shaped void.

11. The device as claimed in claim 1, further comprising a driving motor configured for driving the turnplate to rotate along an axis thereof.

12. The device as claimed in claim 1, wherein the turnplate has plurality of gear teeth at a peripheral edge thereof, the driving motor comprising a gear engaged with the gear teeth of the turnplate.

13. The device as claimed in claim 1, further comprising an image processing system electrically connected to the image sensor.

14. A method for testing lens modules, the method comprising the steps of:
   providing a device for testing the lens modules, the device comprising a testing platform defining a receiving opening; an image sensor facing towards the receiving opening; a light source assembly disposed at a side of the testing platform opposite to the image sensor, the light source assembly being aligned with respect to the image sensor, the light source assembly being configured for providing predetermined testing specimens; and a turnplate received in the receiving opening, the turnplate defining at least two through holes configured for receiving lens modules to be tested;
   sequentially receiving the lens modules to be tested into the at least two through holes and rotating the turnplate to cause the at least two through holes receiving the lens modules therein to face towards the image sensor one by one;
   catching the image of the testing specimen formed by the lens modules in the through hole via the image sensor one by one; and
   determining the testing result based on the image caught by the image sensor.

15. The method as claimed in claim 14, wherein the at least two through holes are alternately shifted to a testing position facing towards the image sensor by means of rotating the turnplate.

16. The method as claimed in claim 15, wherein one through hole is shifted to a testing position, another through hole being simultaneously shifted to a feed-in position, where each lens module to be tested is loaded into its respective through hole.

17. The method as claimed in claim 14, wherein the at least two through holes comprises three through holes, three steps of receiving a lens module to be tested, testing another lens module, and discharging still another lens module tested being simultaneously preformed in the three through holes, respectively.

18. The method as claimed in claim 17, wherein the three steps are alternately performed in each through hole along with the rotation of the turnplate.

* * * * *